US009070076B1

(12) United States Patent
Smith et al.

(10) Patent No.: US 9,070,076 B1
(45) Date of Patent: Jun. 30, 2015

(54) SPOT COLOR PREFLIGHT FOR EXTENDED GAMUT PRINTING (71) Applicant: XEROX Corporation, Norwalk, CT (US)

(72) Inventors: Mark A. Smith, Rochester, NY (US); David E. Rumph, Pasadena, CA (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 14/271,494

(22) Filed: May 7, 2014

(51) Int. Cl.
H04N 1/40 (2006.01)
G06K 15/02 (2006.01)

(52) U.S. Cl.
CPC ................................. G06K 15/1878 (2013.01)

(58) Field of Classification Search
CPC ..... H04N 1/6058; H04N 1/6033; H04N 1/54; H04N 1/62; H04N 1/603; H04N 1/60; H04N 1/6002; H04N 1/0035; H04N 1/6011; H04N 1/00408; H04N 1/00477; H04N 1/0048; H04N 1/00501; H04N 1/506; H04N 1/6019; H04N 1/6025
USPC .......... 358/1.9, 2.1, 500–504, 400, 406, 1.15, 358/3.24, 527; 382/162–167
See application file for complete search history.

(56) References Cited

U.S. PATENT DOCUMENTS

| 6,318,852 | B1 | 11/2001 | White |
| 7,420,699 | B2 | 9/2008 | Farrell et al. |
| 7,649,649 | B2 | 1/2010 | Eschbach et al. |
| 8,294,948 | B2 | 10/2012 | Mestha et al. |
| 8,564,828 | B2 | 10/2013 | Farrell et al. |
| 2005/0099641 | A1* | 5/2005 | Bolognino et al. ............ 358/1.9 |
| 2007/0002343 | A1* | 1/2007 | Butterfield et al. ............ 358/1.9 |
| 2009/0161125 | A1* | 6/2009 | Mestha et al. ................. 358/1.9 |
| 2009/0315318 | A1* | 12/2009 | Jones et al. ...................... 283/85 |
| 2011/0013206 | A1* | 1/2011 | Mestha et al. ................. 358/1.9 |
| 2012/0090488 | A1* | 4/2012 | Postle et al. ................... 101/483 |
| 2012/0249520 | A1 | 10/2012 | Sakurai |
| 2013/0265593 | A1 | 10/2013 | Maltz et al. |
| 2013/0265598 | A1 | 10/2013 | Donaldson et al. |
| 2013/0293612 | A1 | 11/2013 | Smith |

OTHER PUBLICATIONS

N. Tsumura et al., "Color Gamut Mapping based on Mahalanobis Distance for Color Reproduction of Electronic Endoscope Image under Different Illuminant", Department of Information and Computer Sciences, Chiba University, Japan, pp. 158-162, www.mi.tj.chiba-u.jp/~tsumura/Tsumura/papers/CIC5_Mahalanobis.PDF, May 2, 2014.

Gernot Hoffmann, "Gamut Visualizations and Out-of-gamut Distances", pp. 1-21, www.fho-emden.de/~hoffmann/gamshow15052009.pdf, May 2, 2014.

* cited by examiner

Primary Examiner — Thomas D Lee
Assistant Examiner — Stephen M Brinich
(74) Attorney, Agent, or Firm — Gibb & Riley, LLC (57) ABSTRACT Systems and methods for extended gamut printing. A print job is received into a print engine having a processor and a limited number of receptacles for colorant extension attachments that can be used in addition to a standard color gamut. The processor analyzes a page of the print job for the color gamut and for the color gamut with each possible gamut extension colorant. The processor calculates gamut distances for the color of each pixel outside of the color gamut for every gamut colorant extension. The gamut distances are the distances from the color of the pixel to a boundary of the color gamut. The processor calculates a sum of the gamut distances. For each pixel on the page outside of the color gamut, the processor selects an extension colorant attachment to attach to the limited physical receptacles based on having the greatest sum of the gamut distances.

20 Claims, 7 Drawing Sheets

| SPOT COLOR | CMYK | CMYKO | CMYKV | CMYKG |
|---|---|---|---|---|
| PANTONE 102 C | G | G | G | G |
| PANTONE 144 C | R | R | R | Y |
| PANTONE 646 C | Y | Y | Y | Y |
| MY CUSTOM 1 | R | G | R | R |
| MY CUSTOM 2 | Y | Y | Y | Y |

SPOT COLOR PREFLIGHT FOR EXTENDED GAMUT PRINTING

BACKGROUND

Systems and methods herein generally relate to machines having print engines such as printers and/or copier devices and, more particularly, to printer color management in image/text printing or display systems.

To meet customer demand, the commercial printing industry requires the capability of producing spot colors accurately and consistently. Spot colors can be defined as a fixed set of colors, which may be Pantone® colors, customer logo colors, colors in a customer's proprietary marked patterns, or customer defined colors in the form of an index color table. Spot colors are often used, or can be used, for large background areas, which may be the most color critical portion of a particular page. Consistent color in these areas may determine the difference between success and failure in meeting customer requirements. Customer demands for color accuracy and consistency are typically much tighter for spot colors than for colors within images.

The color gamut of a printer is a multi-dimensional space of a given volume with the axes of the space being set or defined initially by the pigments used in the colorants of the primary colors. Each set of color primaries: red, green, blue (RGB) or cyan, magenta, yellow, and black (CMYK), defines a "color space" that includes all colors that can result from any combination of these primaries. The "color space," or "color gamut," may be quite different for different sets of primaries. Typically, a CMYK color gamut falls inside (is smaller than) a RGB color gamut, which means that the eye can detect more colors than a printer can print. In forming multi-color output images on an image-receiving medium, each of the primary colors is transferred to the image-receiving medium in turn. The color gamut is defined by the interaction of the primary colors, and is limited by a total amount of colorant in any combination that can be effectively deposited on the image-receiving medium. In other words, it is not possible to print some colors that can be photographed or displayed on a monitor when using CMYK printing. The color gamut for a particular image forming device and an associated color rendition dictionary (CRD) by which images may be produced by the image forming device is usually stored in metadata with the image forming device. The CRD and associated set of set points programmed into the image forming device, or family of image forming devices, ensures that the color gamut produced by that image forming device covers, as broadly as possible, an available standard color spectrum. Typically then, image forming devices are delivered with a single CRD available in the image production system.

Occasionally, customers or other end-users of an individual image forming device, or family of image forming devices, may desire to produce and/or reproduce, on a recurring basis, a color or set of colors that lies outside the nominal color gamut available based on the single color gamut that comes pre-stored in the image forming device; that is, the prestored spot colors. CRDs and individual process parameter set points are not, however, user adjustable.

Some printing systems include a print engine that supports a gamut extension colorant (in addition to the usual colorants). However, a limited number (perhaps only one) of the possible gamut extension colorants can be installed in the print engine at a time. The problem for the user is to determine which colorant provides the best gamut extension for a given job. The present way of doing this is to make a proof of the job with the first colorant, swap the colorant in the engine for the next colorant, make a proof job with the second colorant, etc. The process is time consuming and tedious.

SUMMARY

In one aspect of systems and methods disclosed herein, a preflight evaluation step analyzes each incoming job for both predefined Spot Color usage and Custom Spot Color usage. Based on this analysis, a processor associated with the image processing device can provide the user with a list of Spot Colors that fall within the standard color gamut, within each extended gamut, and outside of the gamut for various gamut extension colors. Based on this information, the operator can select an appropriate gamut extension colorant for the job.

In another aspect of systems and methods disclosed herein, a preprocessing step interprets a specified number of job pages and computes a summation of "gamut distances" for every supported gamut extension colorant for each pixel that falls outside of the color gamut volume for a standard color gamut, but within the volume for an extended gamut. The result is a figure of merit for each gamut extension colorant. Once this is done, the gamut extension colorant with the highest figure can be used for the print job. Then the print job can be scheduled for normal processing into color separations for subsequent printing. The systems and methods herein, therefore, automatically select a gamut extension colorant that will have the most impact on each print job's color rendition.

According to a method herein, a print job is received into a print engine. The print engine comprises a processor and a limited number of physical receptacles for colorant extension attachments that can be used in addition to a standard color gamut. The processor analyzes a page of the print job for the color gamut and for the color gamut with each possible gamut extension colorant attachment supported by the print engine. The analyzing comprises calculating gamut distances for the color of each pixel on the page outside of the standard color gamut, but within the extended gamut, for every gamut colorant extension supported by the print engine. The gamut distances are the distances from the color of the pixel to a boundary of the standard color gamut. The processor calculates independent sums of the gamut distances for every supported gamut extension colorant. An extension colorant is selected based on having the greatest sum of the gamut distances.

According to another method herein, a print job is received into a print engine supporting colorant extensions for a standard color gamut. The print engine comprises a processor. The print job comprises callouts for spot colors. The processor computes the spot colors using the standard color gamut, producing a first list of in-gamut spot colors and out-of-gamut spot colors. The processor computes the spot colors using the standard color gamut with each gamut colorant extension supported by the print engine, producing second lists of in-gamut spot colors and out-of-gamut spot colors. The processor presents the lists of in-gamut spot colors and out-of-gamut spot colors on a user interface connected to the processor. The processor receives selection of a gamut extension colorant for use in the print job.

According to a printing system, a print engine supports a standard color gamut and a limited number of physical receptacles for colorant extension attachments that can be used in addition to the standard color gamut. A processor is connected to the print engine. A user interface is connected to the processor. The print engine receives a print job comprising callouts for spot colors. The processor parses the print job and creates a first list of spot colors in the print job. The processor computes a first set of spot colors using the standard color gamut, producing in-gamut spot colors and out-of-gamut spot colors for the first set of spot colors. The processor computes second sets of spot colors using each gamut colorant extension supported by the print engine in conjunction with the standard color gamut, producing in-gamut spot colors and out-of-gamut spot colors for the second sets of spot colors. The processor calculates gamut distances for the out-of-gamut spot colors from the first set of spot colors and the second sets of spot colors. The processor creates second lists of spot colors for the in-gamut spot colors and the out-of-gamut spot colors. The processor presents the second lists of spot colors on the user interface. The second lists indicate which spot colors are in-gamut and which are out-of-gamut and indicates the gamut distance for each out-of-gamut spot color. The processor receives selection of one of the second lists for use in the print job.

These and other features are described in, or are apparent from, the following detailed description.

BRIEF DESCRIPTION OF THE DRAWINGS

Various examples of the systems and methods are described in detail below, with reference to the attached drawing figures, which are not necessarily drawn to scale and in which.

DETAILED DESCRIPTION

The disclosure will now be described by reference to a printing apparatus that includes a print engine that supports a standard color gamut and a limited number of physical receptacles for colorant extension attachments that can be used in addition to the standard color gamut. While the disclosure will be described hereinafter in connection with specific systems and methods thereof, it will be understood that limiting the disclosure to such specific systems and methods is not intended. On the contrary, it is intended to cover all alternatives, modifications, and equivalents as may be included within the spirit and scope of the disclosure as defined by the appended claims.

For a general understanding of the features of the disclosure, reference is made to the drawings. In the drawings, like reference numerals have been used throughout to identify identical elements.

Consider an exemplary image forming device having a print engine that can support several colorants at a time. According to systems and methods herein, four of the colorants may be cyan, magenta, yellow, and black (CMYK). A fifth colorant may be, for example, Orange, Violet, Green, or other appropriate color. It will be appreciated that when the print engine is configured with CMYKO (orange colorant extension) that its gamut volume is different in size and shape from when configured with CMYKV (violet colorant extension). Moreover, both of these gamuts are still different from when the print engine is configured with CMYKG (green colorant extension). Unless the print engine operator has intimate knowledge of how each job to be printed is constructed (which is exceedingly unlikely), the operator has no clue as to which of the possible gamut extension colorants is appropriate for use with each job.

When jobs containing named spot color callouts are submitted to a system containing this print engine, a typical preflight operation implemented by a processor for the image forming device will provide the operator with a list of the spot colors used by the job. This list contains both "factory installed" spot colors and custom spot colors. Again, unless the print engine operator has intimate knowledge of how each spot color is formulated (which is exceedingly unlikely), the operator has no clue as to which of the possible gamut extension colorants is appropriate for use with each job.

According to systems and methods herein, a gamut-aware preflight evaluation step is implemented within the processor of the printing system that contains the print engine supporting several possible gamut extension colorants.

Figure 1:
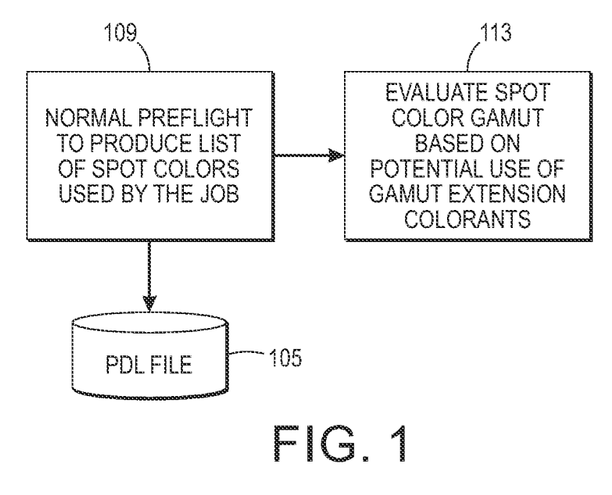
FIG. 1 is a flow diagram illustrating a broad overview of a method according to systems and methods herein.

Referring to FIG. 1, an incoming job includes a PDL file 105 that describes the appearance of a printed page according to the job. The input may be a page description using a page description language (PDL). A page description language (PDL) is a computer language that describes for the print engine the appearance of a printed page in a higher level than an actual output bitmap. The PDL file 105 specifies the arrangement of the printed page through commands for the print engine. A preflight operation parses the incoming job and creates a list of the spot colors used by the job 109. After creating the list of the spot colors used by the job at 109, the spot color gamut is evaluated for potential use of a gamut extension colorant 113.

Figure 2:
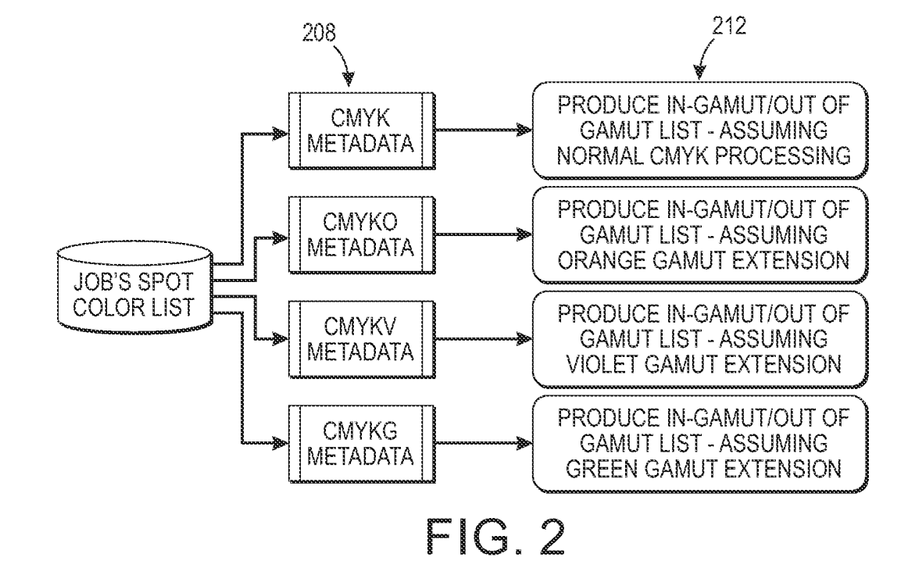
FIG. 2 is a flow diagram illustrating an evaluation step according to systems and methods herein.

Referring to FIG. 2, in order to evaluate potential gamut extension colorants, metadata 208 associated with each gamut extension profile is evaluated. The metadata 208 indicates the relationship of each named spot color with regard to the color gamut, based on each gamut extension colorant. For example, $0\Delta E$ indicates an in-gamut color, $2\Delta E$ might indicate a color near the gamut boundary, and $10\Delta E$ might indicate a color far out of the gamut.

Figure 3:
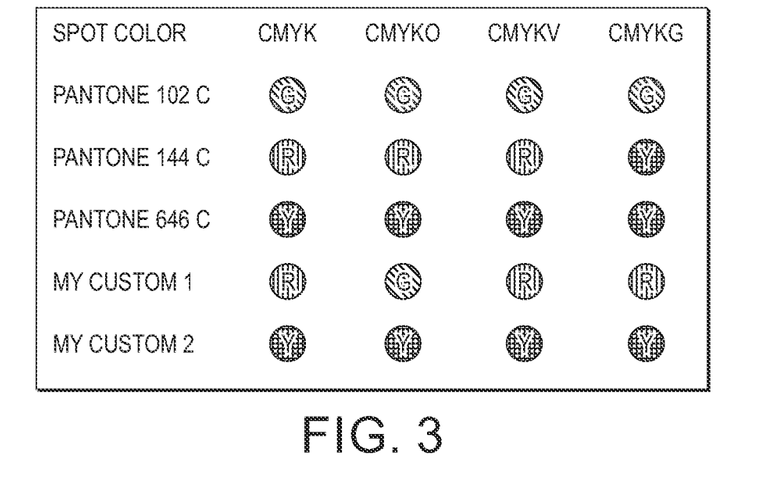
FIG. 3 is an exemplary user interface display for selecting spot colors according to systems and methods herein.

As shown in FIG. 2, the processor would then produce additional gamut-specific spot color lists for each gamut extension colorant 212. The specific spot color lists may indicate which named spot colors are in-gamut and which are out-of-gamut. According to systems and methods herein, the processor presents the in-gamut spot colors and the out-of-gamut spot colors on a user interface, such as shown in FIG. 3. Each specific spot color list may be displayed with the $\Delta E$ numbers. The actual spot color may be shown on the user interface; alternatively, a simple Red, Yellow, Green indication associated with each listed spot colorant could be used. The operator can evaluate the specific color lists and select an appropriate gamut extension colorant to process and print the job in a manner that will render the spot colors in the best possible way.

According to systems and methods herein, the spot color metadata associated with each profile on the system can be created after the profile itself is created by the system; or as part of a $3^{rd}$ party profile import process. The metadata can be identified by name:value pairs, where the name is the spot color name and the value is the $\Delta E$ distance of the spot color from the profile's gamut boundary. The ΔE distance may be determined using any appropriate color space measurement. For example, as would be known by one skilled in the art, using L*a*b*, a value of 0 is considered to be in-gamut.

According to systems and methods herein, the processor operator specifies custom spot colorant values (e.g. CMYKO) in conjunction with a selected profile (e.g. the CMYKO profile). This being the case, the processor can use the profile to ascertain a new spot color's L*a*b*. The processor can then determine the custom spot color's metadata, and append it to the metadata associated with the profile. In this way, defined custom spot colors can be handled (from a preflight perspective) the same as the factory-installed spot colors.

In addition, the processor could offer the operator rules enabling the processor to automatically select an appropriate gamut extension colorant for each incoming job, such as to maximize the number of in-gamut spot colors or to minimize the total error (i.e. minimize the sum of the ΔEs for spot colors used by the job).

In some cases, the processor could perform gamut volume analysis at preflight time for undefined spot colors that are specified in the job. Since these spot colors are undefined, the processor will ultimately render them using the alternate color space specified in the PDL for the object. The in-gamut/out of gamut determination would therefore be based on the distance of the object's color (as specified via the alternate color space) to the profile gamut boundary.

Figure 4:
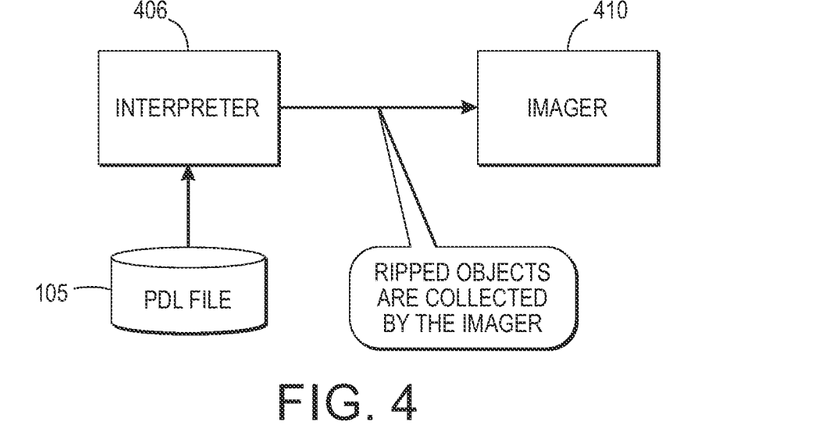
FIG. 4 is a flow diagram illustrating a broad overview of a method according to systems and methods herein.

According to another aspect of the systems and methods herein, an incoming job includes a PDL file 105 that describes the appearance of a printed page according to the job, as shown in FIG. 4. As described above, the PDL file 105 specifies the arrangement of the printed page through commands for the print engine. An interpreter 406 is used in a preprocessing step to interpret a specified number of job pages and compute "gamut distances" for every supported gamut extension colorant for each pixel that falls outside of the standard CMYK gamut volume.

An exemplary processing system may include an interpreter 406 and an imager 410, as shown in FIG. 4. The interpreter 406 and an imager 410 are classic components of a two-part raster image processor (RIP), such as may be used to prepare the job for printing. As would be known by one skilled in the art, a raster image processor is a component used in a printing system that produces a raster image, also known as a bitmap. The bitmap is then sent to a printing device for output. Raster image processing is the process that turns the job input information into a high-resolution raster image. The input may be a page description using a page description language (PDL) of higher or lower resolution than the output device. In the latter case, the RIP applies either smoothing or interpolation to the input bitmap to generate the output bitmap.

According to systems and methods herein, the interpreter parses the PDL file 105 according to PDL-specific language constructs, and changes these into pdl-language neutral "objects" that are presented to the imager 410 for collection. In this way, various language-specific interpreters can be mated with a single imager implementation.

Once the imager 410 has collected all objects, it "flattens" them to determine which regions of which objects will be visible. Then the imager "colorizes" the visible objects by applying a profile to convert from the Profile Connection color Space (PCS) to the CMYK values the printer will apply at print time, as shown in FIG. 5.

According to systems and methods herein, the imager 410 can apply multiple profiles to the same flattened objects. In the exemplary system, the processor would not only apply the CMYK profile 511; but also the profile with Orange gamut extension 514, the profile with Violet gamut extension 517, and the profile with Green gamut extension 520.

Referring again to FIG. 5, the processor then determines if any pixel in the colorized object falls outside of the boundary of the standard CMYK gamut, but within the Orange gamut extension boundary 523. If so, the processor computes the vector distance between the pixel and the CMYK gamut boundary. If the object does not fall within the Orange gamut extension, the processor then performs the same checks for the Violet gamut extension 526 and the Green gamut extension 529. The nature of gamut extension is such that if a pixel is located within one gamut extension, it will not simultaneously be in one of the other gamut extensions. So, the method can be optimized to stop after a pixel has been determined to be in a particular gamut extension. For each pixel outside of the boundary of the standard CMYK gamut, but inside one of the color extension boundaries, the processor computes the vector distance between the pixel and the CMYK gamut boundary and keeps a running total of these vector differences for each extension colorant.

Figure 5:
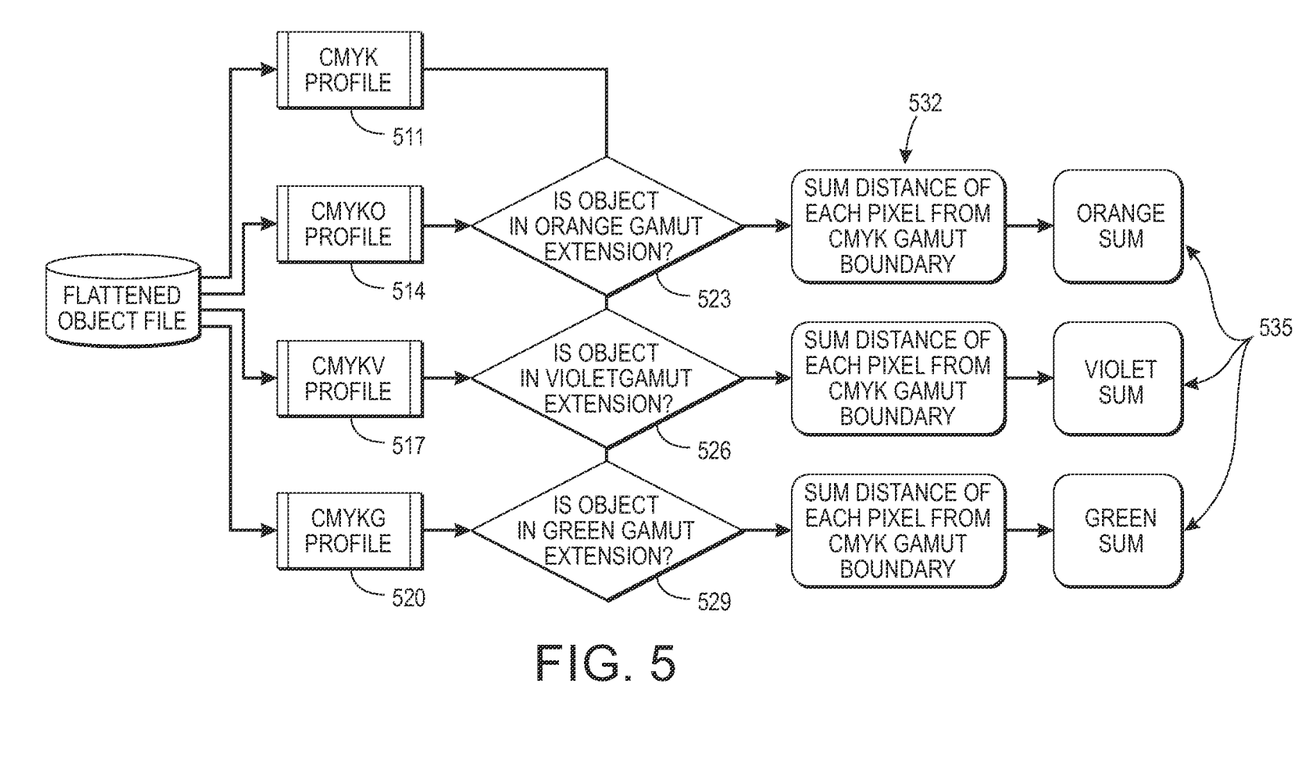
FIG. 5 is a flow diagram illustrating an evaluation step according to systems and methods herein.

For constant color objects (i.e. every pixel has the same color value), once the first pixel has been processed according to FIG. 5, all remaining visible pixels in the object have exactly the same vector sum. On the other hand, sweeping changes of color entail more processing. For example, in a sweep from Orange to Green, the object will have some pixels in the Orange gamut extension region followed by some pixels in the CMYK region, followed by the remaining pixels in the Green region.

The processor evaluates the sum of the vector differences for each extension colorant and sets the gamut extension colorant with the highest figure of merit on the job properties. Alternately, the system may provide the operator with a way of setting some minimum per-page threshold, so that a job with only a few pixels outside of the CMYK gamut is processed and printed with only CMYK colorants, instead of the (presumably) more expensive gamut extension colorants.

After a given page in the job has been processed as described above, each subsequent page of the job to be processed is treated in the same way. The result is a figure of merit for each gamut extension colorant.

Note that it is not necessary for the "imager" used in the gamut extension processor to actually produce an image. Print-ready images may be created later when the job is processed for printing.

According to systems and methods herein, once the gamut colorant extension, if any, has been selected, the job can be scheduled for RIP and Print in the normal way. If the processor implements a resource based scheduling scheme, the gamut extension colorant job property can be checked against the gamut extension colorant presently loaded in the connected print engine. If there is a match, the job is eligible for scheduling; if not the job becomes ineligible for scheduling until the printer operator installs the pertinent colorant in the print engine. In this way, groups of jobs can be printed with the same gamut extension colorant, while minimizing the number of times the operator has to change the engine's loaded colorant.

Note that it is not necessary to process the job at the printer's resolution during the preflight analysis. Quicker processing is possible at lower resolutions. Processing at lower resolutions makes the operation run faster at only slight degradation in quality of the colorant prediction.

While systems and methods have been described herein with reference to a CMYK color gamut, it is contemplated that the concepts described herein are also applicable to the RGB color gamut, and others. As would be understood by one of ordinary skill in the art, the standard color gamut described herein may be based on CIE xyY color space.

Figure 6:
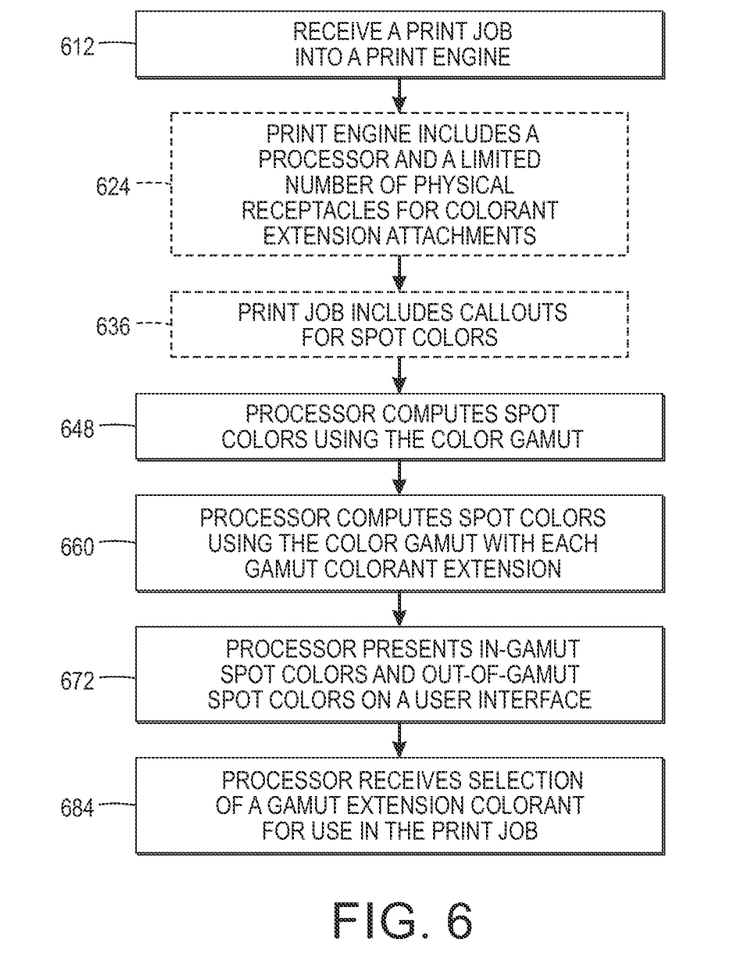
FIG. 6 is a flow diagram illustrating methods herein.

FIG. 6 is a flow diagram illustrating the processing flow of an exemplary method according to a first aspect of systems and methods herein. At 612, a print job is received into a print engine. The print engine is of the type that supports colorant extensions for a color gamut. As indicated at 624, the print engine includes a processor and a limited number of physical receptacles for colorant extension attachments that can be used in addition to a standard color gamut. In addition, as indicated at 636, the print job includes callouts for spot colors. At 648, the processor computes the spot colors using the standard color gamut, producing a first list of in-gamut spot colors and a first list of out-of-gamut spot colors. At 660, the processor computes the spot colors using the standard color gamut with each gamut colorant extension supported by the print engine, producing second lists of in-gamut spot colors and second lists of out-of-gamut spot colors. The processor presents the lists of in-gamut spot colors and the lists of out-of-gamut spot colors on a user interface connected to the processor, at 672. At 684, the processor receives selection of a gamut extension colorant for use in the print job.

Figure 7:
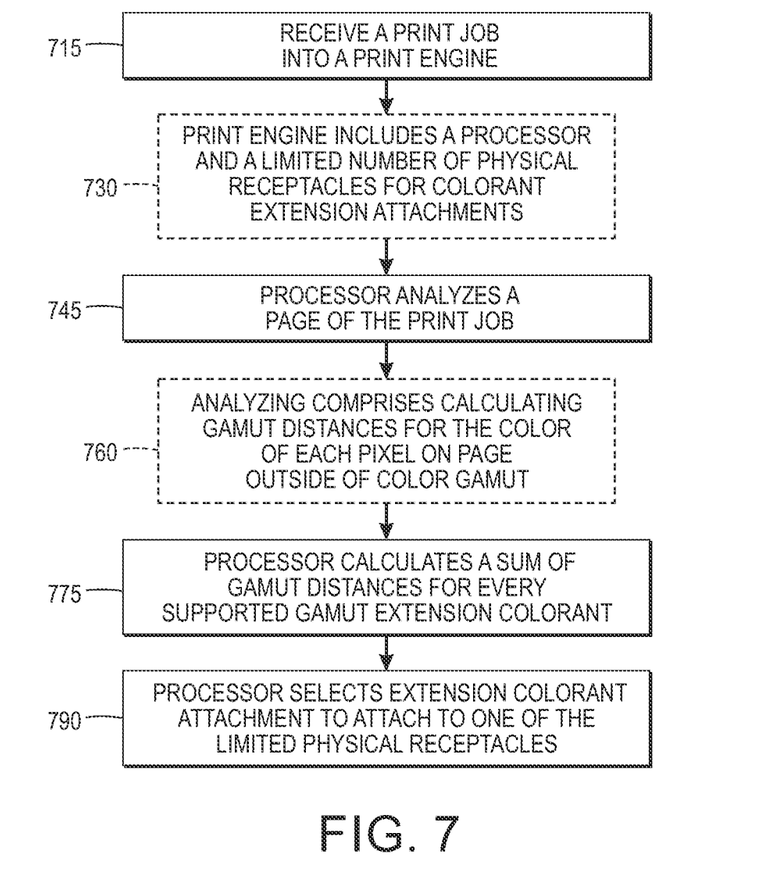
FIG. 7 is a flow diagram illustrating methods herein.

FIG. 7 is a flow diagram illustrating the processing flow of an exemplary method according to a second aspect of systems and methods herein. At 715, a print job is received into a print engine. As indicated at 730, the print engine includes a processor and a limited number of physical receptacles for colorant extension attachments that can be used in addition to a standard color gamut. At 745, the processor analyzes a page of the print job for the standard color gamut and for the color gamut with each possible gamut extension colorant attachment supported by the print engine. As indicated at 760, the analyzing comprises calculating gamut distances for the color of each pixel on the page outside of the standard color gamut for every gamut colorant extension supported by the print engine. The gamut distances are the distances from the pixel to a boundary of the color gamut. At 775, the processor calculates independent sums of the gamut distances for every supported gamut extension colorant. At 790, the processor selects an extension colorant attachment to attach to the limited number of physical receptacles. The selected extension colorant is based on having the greatest sum of the gamut distances. The process can then be repeated for each of a specified number of pages.

As used herein, a "pixel" refers to the smallest segment into which an image can be divided. Received pixels of an input image are associated with a color value defined in terms of a color space, such as color, intensity, lightness, brightness, or some mathematical transformation thereof. Pixel color values may be converted to a chrominance-luminance space using, for instance, an RBG-to-YCbCr converter to obtain luminance (Y) and chrominance (Cb, Cr) values. It should be appreciated that pixels may be represented by values other than RGB or YCbCr.

Figure 8:
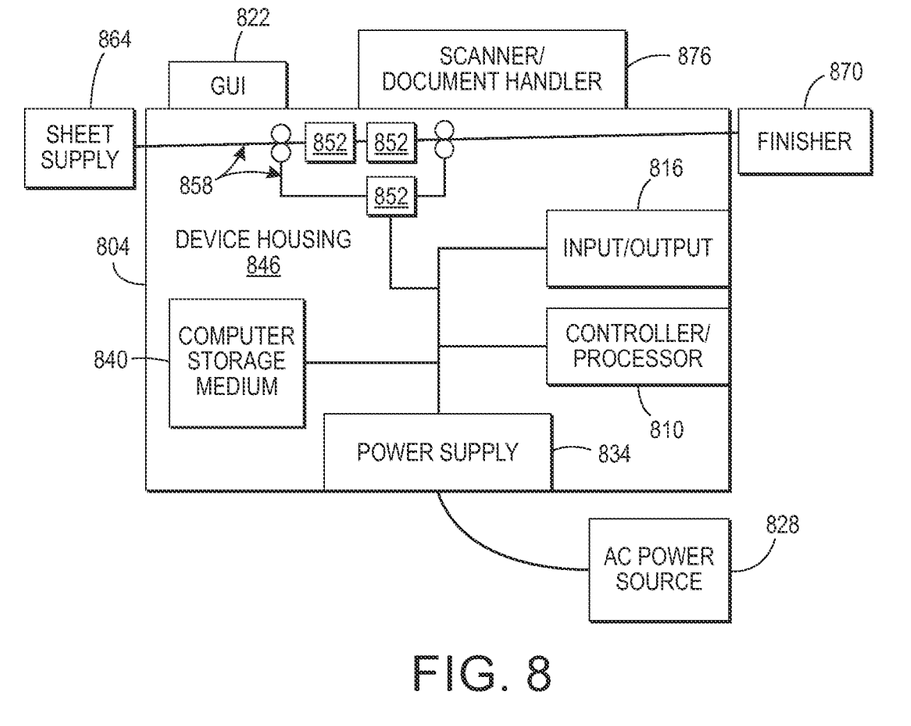
FIG. 8 is a side-view schematic diagram of a multi-function device according to systems and methods herein.
Figure 9:
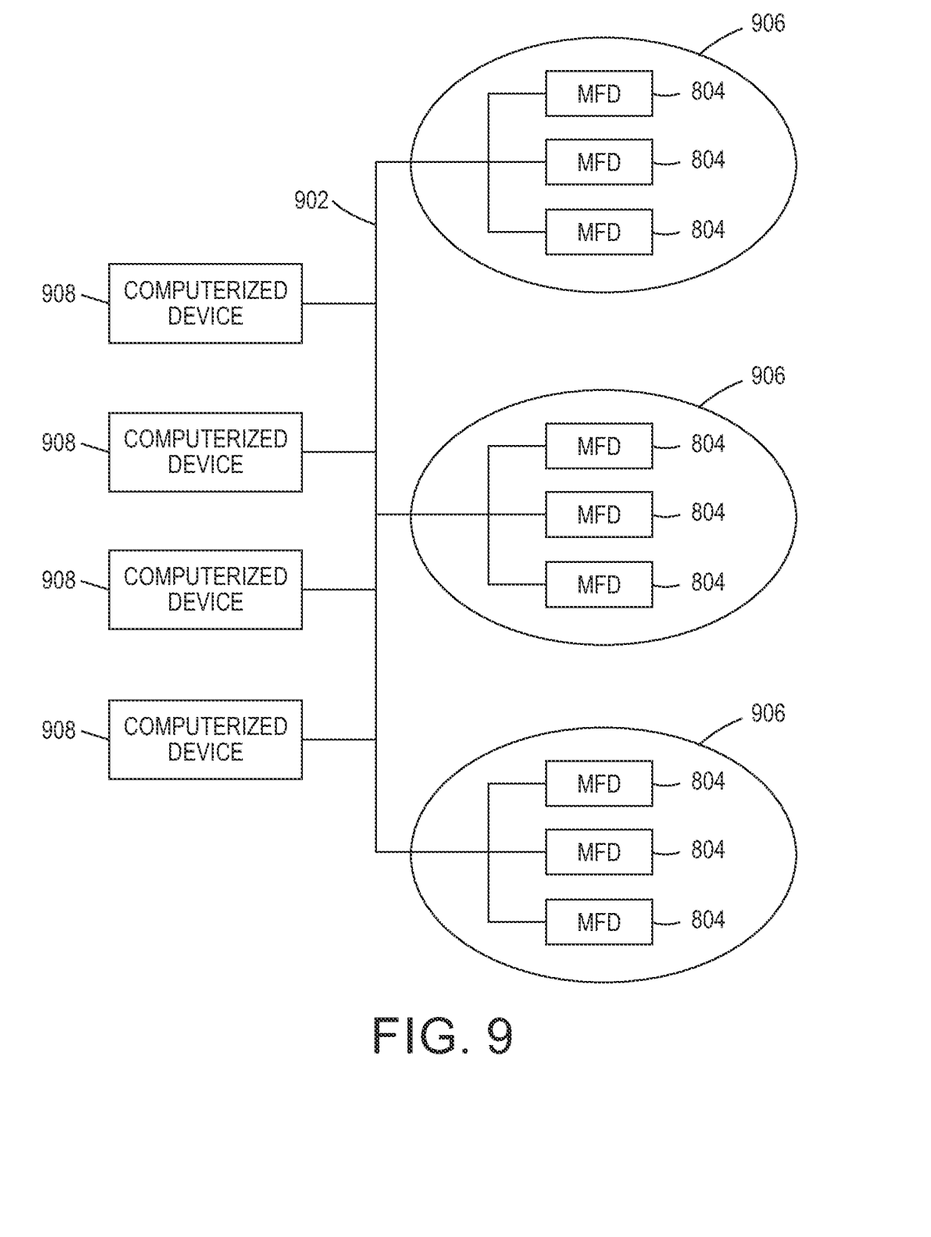
FIG. 9 is a schematic diagram illustrating systems and methods herein.

FIG. 8 illustrates a multi-function device 804 that can be used with systems and methods herein and can comprise, for example, a printer, copier, multi-function machine, etc. The multi-function device 804 includes a controller/processor 810 and a communications port (input/output) 816 operatively connected to the controller/processor 810 and to a network 902 external to the multi-function device 804, as shown in FIG. 9. In addition, the multi-function device 804 can include at least one accessory functional component, such as a graphic user interface (GUI) assembly 822 that operates on the power supplied from the AC power source 828, which may be external to the multi-function device 804. The AC power source 828 may provide electrical power through the power supply 834.

The controller/processor 810 controls the various actions of the multi-function device 804. A non-transitory computer storage medium device 840 (which can be optical, magnetic, capacitor based, etc.) is readable by the controller/processor 810 and stores instructions that the controller/processor 810 executes to allow the multi-function device 804 to perform its various functions, such as those described herein. Thus, as shown in FIG. 8, a device housing 846 has one or more functional components that operate on power supplied from the AC power source 828 by the power supply 834. The power supply 834 can comprise a power storage element (e.g., a battery) and connects to the AC power source 828, which may be external to the multi-function device 804. The power supply 834 converts the external power into the type of power needed by the various components.

The multi-function device 804 includes at least one marking device (printing engines) 852 operatively connected to the controller/processor 810, a media path 858 positioned to supply sheets of media from a sheet supply 864 to the marking device(s) 852, etc. After receiving various markings from the printing engine(s), the sheets of media can optionally pass to a finisher 870 which can fold, staple, sort, etc., the various printed sheets. In addition, the multi-function device 804 can include at least one accessory functional component (such as a scanner/document handler 876, etc.) that also operates on the power supplied from the AC power source 828 (through the power supply 834).

As would be understood by those ordinarily skilled in the art, the multi-function device 804 shown in FIG. 8 is only one example and the systems and methods herein are equally applicable to other types of printing devices that may include fewer components or more components. For example, while a limited number of printing engines and paper paths are illustrated in FIG. 8, those ordinarily skilled in the art would understand that many more paper paths and additional printing engines could be included within any printing device used with systems and methods herein.

Thus, an image input device is any device capable of obtaining color pixel values from a color image. The set of image input devices is intended to encompass a wide variety of devices such as, for example, digital document devices, computer systems, memory and storage devices, networked platforms such as servers and client devices which can obtain pixel values from a source device, and image capture devices. The set of image capture devices includes scanners, cameras, photography equipment, facsimile machines, photo reproduction equipment, digital printing presses, xerographic devices, and the like. A scanner is one image capture device that optically scans images, print media, and the like, and converts the scanned image into a digitized format. Common scanning devices include variations of the flatbed scanner, generally known in the arts, wherein specialized image receptors move beneath a platen and scan the media placed on the platen. Modern digital scanners typically incorporate a charge-coupled device (CCD) or a contact image sensor (CIS) as the image sensing receptor(s). The scanning device produces a signal of the scanned image data. Such a digital signal contains information about pixels such as color value, intensity, and their location within the scanned image.

Further, an image output device is any device capable of rendering the image. The set of image output devices includes digital document reproduction equipment and other copier systems as are widely known in commerce, photographic production and reproduction equipment, monitors and other displays, computer workstations and servers, including a wide variety of color marking devices, and the like.

To render an image is to reduce the image data (or a signal thereof) to viewable form; store the image data to memory or a storage device for subsequent retrieval; or communicate the image data to another device. Such communication may take the form of transmitting a digital signal of the image data over a network.

It is contemplated that the systems and methods described herein are applicable to color marking material as well as simple black marking material. A contone is a characteristic of a color image such that the image has all the values (0 to 100%) of gray (black/white) or color in it. A contone can be approximated by millions of gradations of black/white or color values. The granularity of computer screens (i.e., pixel size) can limit the ability to display absolute contones. The term halftoning means a process of representing a contone image by a bi-level image such that, when viewed from a suitable distance, the bi-level image gives the same impression as the contone image. Halftoning reduces the number of quantization levels per pixel in a digital image. Over the long history of halftoning, a number of halftoning techniques have been developed which are adapted for different applications.

Traditional clustered dot halftones were restricted to a single frequency because they were generated using periodic gratings that could not be readily varied spatially. Halftoning techniques are widely employed in the printing and display of digital images and are used because the physical processes involved are binary in nature or because the processes being used have been restricted to binary operation for reasons of cost, speed, memory, or stability in the presence of process fluctuations. Classical halftone screening applies a mask of threshold values to each color of the multi-bit image. Thresholds are stored as a matrix in a repetitive pattern. Each tile of the repetitive pattern of the matrix is a halftone cell. Digital halftones generated using threshold arrays that tile the image plane were originally designed to be periodic for simplicity and to minimize memory requirements. With the increase in computational power and memory, these constraints become less stringent. Digital halftoning uses a raster image or bitmap within which each monochrome picture element or pixel may be ON or OFF (ink or no ink). Consequently, to emulate the photographic halftone cell, the digital halftone cell must contain groups of monochrome pixels within the same-sized cell area.

As shown in FIG. 9, exemplary printers, copiers, multi-function machines, and multi-function devices (MFD) 804 may be located at various different physical locations 906. Other devices according to systems and methods herein may include various computerized devices 908. The computerized devices 908 can include print servers, printing devices, personal computers, etc., and are in communication (operatively connected to one another) by way of a network 902. The network 902 may be any type of network, including a local area network (LAN), a wide area network (WAN), or a global computer network, such as the Internet.

Aspects of the present disclosure are described herein with reference to flowchart illustrations and/or block diagrams of methods, apparatus (systems), and computer program products according to various systems and methods. It will be understood that each block of the flowchart illustrations and/or two-dimensional block diagrams, and combinations of blocks in the flowchart illustrations and/or block diagrams, can be implemented by computer program instructions. The computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

According to a further device and method herein, an article of manufacture is provided that includes a tangible computer readable medium having computer readable instructions embodied therein for performing the steps of the computer implemented methods, including, but not limited to, the methods illustrated in FIGS. 6 and 7. Any combination of one or more computer readable non-transitory medium(s) may be utilized. The computer readable medium may be a computer readable signal medium or a computer readable storage medium. The non-transitory computer storage medium stores instructions, and a processor executes the instructions to perform the methods described herein. A computer readable storage medium may be, for example, but not limited to, an electronic, magnetic, optical, electromagnetic, infrared, or semiconductor system, apparatus, or device, or any suitable combination of the foregoing. Any of these devices may have computer readable instructions for carrying out the steps of the methods described above with reference to FIGS. 6 and 7.

The computer program instructions may be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

Furthermore, the computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

In case of implementing the systems and methods herein by software and/or firmware, a program constituting the software may be installed into a computer with dedicated hardware, from a storage medium or a network, and the computer is capable of performing various functions if with various programs installed therein.

In the case where the above-described series of processing is implemented with software, the program that constitutes the software may be installed from a network such as the Internet or a storage medium such as the removable medium. Examples of a removable medium include a magnetic disk (including a floppy disk), an optical disk (including a Compact Disk-Read Only Memory (CD-ROM) and a Digital Versatile Disk (DVD)), a magneto-optical disk (including a Mini-Disk (MD) (registered trademark)), and a semiconductor memory. Alternatively, the storage medium may be the ROM, a hard disk contained in the storage section of the disk units, or the like, which has the program stored therein and is distributed to the user together with the device that contains them.

As will be appreciated by one skilled in the art, aspects of the systems and methods herein may be embodied as a system, method, or computer program product. Accordingly, aspects of the present disclosure may take the form of an entirely hardware system, an entirely software system (including firmware, resident software, micro-code, etc.) or an system combining software and hardware aspects that may all generally be referred to herein as a "circuit," "module", or "system." Furthermore, aspects of the present disclosure may take the form of a computer program product embodied in one or more computer readable medium(s) having computer readable program code embodied thereon.

Any combination of one or more computer readable non-transitory medium(s) may be utilized. The computer readable medium may be a computer readable signal medium or a computer readable storage medium. The non-transitory computer storage medium stores instructions, and a processor executes the instructions to perform the methods described herein. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a Read Only Memory (ROM), an Erasable Programmable Read Only Memory (EPROM or Flash memory), an optical fiber, a magnetic storage device, a portable compact disc Read Only Memory (CD-ROM), an optical storage device, a "plug-and-play" memory device, like a USB flash drive, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including, but not limited to, wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++, or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The flowchart and block diagrams in the figures illustrate the architecture, functionality, and operation of possible implementations of systems, methods, and computer program products according to various systems and methods herein. In this regard, each block in the flowchart or block diagrams may represent a module, segment, or portion of code, which comprises one or more executable instructions for implementing the specified logical function(s). It should also be noted that, in some alternative implementations, the functions noted in the block might occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Many computerized devices are discussed above. Computerized devices that include chip-based central processing units (CPU's), input/output devices (including graphic user interfaces (GUI), memories, comparators, processors, etc. are well-known and readily available devices produced by manufacturers such as Dell Computers, Round Rock Tex., USA and Apple Computer Co., Cupertino Calif., USA. Such computerized devices commonly include input/output devices, power supplies, processors, electronic storage memories, wiring, etc., the details of which are omitted herefrom to allow the reader to focus on the salient aspects of the embodiments described herein. Similarly, scanners and other similar peripheral equipment are available from Xerox Corporation, Norwalk, Conn., USA and the details of such devices are not discussed herein for purposes of brevity and reader focus.

The terms printer or printing device as used herein encompasses any apparatus, such as a digital copier, bookmaking machine, facsimile machine, multi-function machine, etc., which performs a print outputting function for any purpose. The details of printers, printing engines, etc., are well known by those ordinarily skilled in the art and are discussed in, for example, U.S. Pat. No. 6,032,004, the complete disclosure of which is fully incorporated herein by reference. Such details are not described in detail herein to keep this disclosure focused on the salient features presented. The systems and methods herein can encompass devices that print in color, monochrome, or handle color or monochrome image data. All foregoing systems and methods are specifically applicable to electrostatographic, xerographic and/or inkjet machines and/or processes.

The terminology used herein is for the purpose of describing particular systems and methods only and is not intended to be limiting of this disclosure. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

In addition, terms such as "right", "left", "vertical", "horizontal", "top", "bottom", "upper", "lower", "under", "below", "underlying", "over", "overlying", "parallel", "perpendicular", etc., used herein, are understood to be relative locations as they are oriented and illustrated in the drawings (unless otherwise indicated). Terms such as "touching", "on", "in direct contact", "abutting", "directly adjacent to", etc., mean that at least one element physically contacts another element (without other elements separating the described elements). Further, the terms 'automated' or 'automatically' mean that once a process is started (by a machine or a user), one or more machines perform the process without further input from any user.

The corresponding structures, materials, acts, and equivalents of all means or step plus function elements in the claims below are intended to include any structure, material, or act for performing the function in combination with other claimed elements as specifically claimed. The descriptions of the various systems and methods of the present disclosure have been presented for purposes of illustration, but are not intended to be exhaustive or limited to the systems and methods disclosed. Many modifications and variations will be apparent to those of ordinary skill in the art without departing from the scope and spirit of the described systems and methods. The terminology used herein was chosen to best explain the principles of the systems and methods, the practical application or technical improvement over technologies found in the marketplace, or to enable others of ordinary skill in the art to understand the systems and methods disclosed herein.

It will be appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. Unless specifically defined in a specific claim itself, steps or components of the systems and methods herein cannot be implied or imported from any above example as limitations to any particular order, number, position, size, shape, angle, color, or material.

What is claimed is:

1. A method, comprising:
   receiving a print job into a print engine comprising a processor and a limited number of physical receptacles for colorant extension attachments that can be used in addition to a standard color gamut;
   analyzing, by said processor, a page of said print job for said standard color gamut and for said standard color gamut with each possible gamut extension colorant attachment supported by said print engine, said analyzing comprising:
       calculating gamut distances for the color of each pixel on said page outside of said standard color gamut, but within the extended gamut for every gamut colorant extension supported by said print engine, said gamut distances comprising distances from said color of said pixel to a boundary of said standard color gamut;
   calculating, by said processor, independent sums of said gamut distances for every supported gamut extension colorant; and
   selecting, by said processor, an extension colorant attachment to attach to one of said limited number of physical receptacles, said selected extension colorant being based on having the greatest sum of said gamut distances.

2. The method according to claim 1, said standard color gamut comprising cyan, yellow, magenta, and black.

3. The method according to claim 1, said standard color gamut comprising red, green, and blue.

4. The method according to claim 1, said standard color gamut being based on CIE xyY color space.

5. The method according to claim 1, said gamut distances comprising vector distances from the color of said pixel to said boundary of said standard color gamut.

6. The method according to claim 1, the color for said gamut colorant extension comprising orange, violet, or green.

7. The method according to claim 1, said receiving a print job comprising receiving a PDL file, and said analyzing further comprising:
   parsing said PDL file;
   identifying objects from said PDL file;
   flattening said objects and determining regions of said objects that will be visible upon printing; and
   colorizing said objects according to a color profile for said standard color gamut and for said standard color gamut with each possible gamut extension colorant attachment supported by said print engine.

8. The method according to claim 7, further comprising:
   determining if any pixel in said objects that are colorized falls outside of said boundary of said standard color gamut and within a boundary of the color gamut that includes any of said possible gamut extension colorants.

9. A method, comprising:
   receiving a print job into a print engine supporting colorant extensions for a standard color gamut, said print engine comprising a processor, said print job comprising callouts for spot colors;
   computing, by said processor, said spot colors using said standard color gamut, producing a first list of in-gamut spot colors and out-of-gamut spot colors;
   computing, by said processor, said spot colors using said standard color gamut with each gamut colorant extension supported by said print engine, producing second lists of in-gamut spot colors and out-of-gamut spot colors;
   presenting, by said processor, said lists of in-gamut spot colors and out-of-gamut spot colors on a user interface connected to said processor; and
   receiving, by said processor, selection of a gamut extension colorant for use in said print job.

10. The method according to claim 9, said color gamut comprising cyan, yellow, magenta, and black.

11. The method according to claim 9, said color gamut comprising red, green, and blue.

12. The method according to claim 9, said color gamut being based on CIE xyY color space.

13. The method according to claim 9, said presenting said lists of in-gamut spot colors and out-of-gamut spot colors on said user interface further comprising indicating how far out of gamut each spot color is.

14. A printing system, comprising:
   a print engine supporting a standard color gamut and a limited number of physical receptacles for colorant extension attachments that can be used in addition to said standard color gamut;
   a processor connected to said print engine; and
   a user interface connected to said processor,
       said print engine receiving a print job comprising callouts for spot colors,
       said processor parsing said print job and creating a first list of spot colors in said print job,
       said processor computing a first set of spot colors using said standard color gamut, producing in-gamut spot colors and out-of-gamut spot colors for said first set of spot colors,
       said processor computing second sets of spot colors using said standard color gamut with each gamut colorant extension supported by said print engine, producing in-gamut spot colors and out-of-gamut spot colors for said second sets of spot colors,
       said processor calculating gamut distances for said out-of-gamut spot colors from said first set of spot colors and said second sets of spot colors,
       said processor creating second lists of said spot colors for said in-gamut spot colors and said out-of-gamut spot colors, said processor presenting said second lists of said spot colors on said user interface, said second lists indicating which spot colors are in-gamut and which are out-of-gamut and indicating said gamut distance for each out-of-gamut spot color, and said processor receiving selection of one of said second lists for use in said print job.

15. The printing system according to claim 14, said standard color gamut comprising cyan, yellow, magenta, and black.

16. The printing system according to claim 14, said standard color gamut comprising red, green, and blue.

17. The printing system according to claim 14, said color gamut being based on CIE xyY color space.

18. The printing system according to claim 14, the color for said gamut colorant extension comprising orange, violet, or green.

19. The printing system according to claim 14, further comprising:
   said processor receiving a print job further comprising said processor receiving a PDL file,
   said processor parsing said PDL file,
   said processor identifying objects from said PDL file,
   said processor flattening said objects and determining regions of said objects that will be visible upon printing, and
   said processor colorizing said objects according to a color profile for said standard color gamut and for said standard color gamut with each possible gamut extension colorant attachment supported by said print engine.

20. The printing system according to claim 19, further comprising:
   said processor determining if any pixel in said objects that are colorized falls outside of a boundary of said standard color gamut and within a boundary of said standard color gamut with any of said possible gamut extension colorants.

* * * * *